Dec. 24, 1968    P. M. GROGAN    3,417,797
HAND SAW GUARD
Filed Feb. 21, 1967

INVENTOR.
PATRICK M. GROGAN
BY Eugene D. Farley
ATTORNEY

United States Patent Office 3,417,797
Patented Dec. 24, 1968

3,417,797
HAND SAW GUARD
Patrick M. Grogan, Salem, Oreg., assignor of one-fourth to Laurence V. Martin and Lillian N. Martin jointly, both of Redondo Beach, Calif.
Filed Feb. 21, 1967, Ser. No. 617,620
1 Claim. (Cl. 145—35)

ABSTRACT OF THE DISCLOSURE

A guard for covering the teeth of hand saws during transportation and storage comprises a continuous length of extruded plastic having a longitudinal chamber section dimensioned to receive the teeth and a communicating longitudinal grip section adapted to grip the saw blade immediately above the teeth, thereby releasably retaining the guard on the saw.

---

Figure 1:
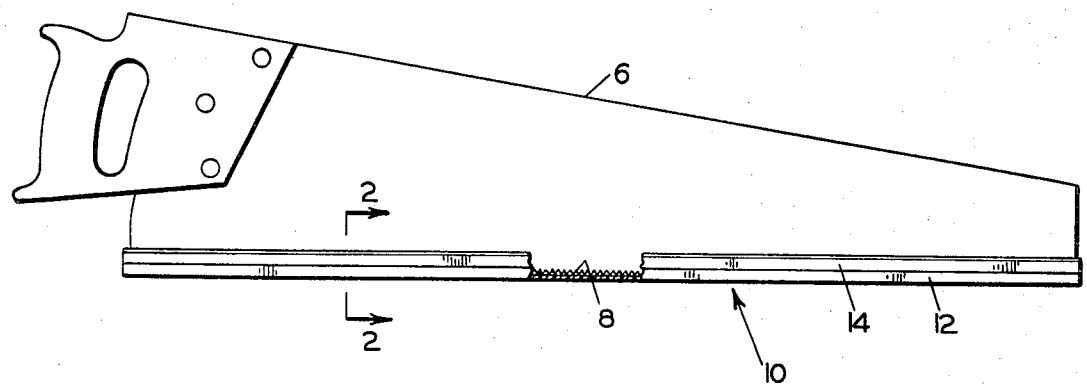

This invention relates to guards for various categories of hand saws, including the various types of carpenter's saws, metal cutting saws, meat cutting saws, buck saws, crosscut saws, and the like. It is particularly applicable to the conventional carpenter's hand saws.

As is well known, the teeth of a sharp saw are highly susceptible to damage upon being struck by a solid object, the result being to rivet the teeth or knock out their set, so that a costly re-sharpening job is required before the saws again may be used. Also, it is a common occurrence for objects with which the saw teeth inadvertently may come in contact to be marred or scratched by such contact.

Accordingly it is common practice for saw sharpening shops, carpenters, and other persons handling hand saws to wrap the saws in newspaper, or to place them between pieces of lumber, or to place them in special cases, in order to maintain the fine cutting edges of the saws, as well as to protect surrounding articles from damage. These expedients are effective, but obviously tedious of application.

It is the general object of the present invention to provide a simple, inexpensive saw guard which easily may be applied to the working edges of hand saws for the purpose of protecting the teeth, while at the same time protecting from damage articles with which the teeth may come in contact, including the hands of the person using the saw.

It is a further object of the invention to provide a saw guard which is applicable to various types of hand saws, which grips the saw teeth securely but releasably, and which is so inexpensive that it may be given away as a favor by interested persons, for example, by professional saw sharpeners.

Figure 2:
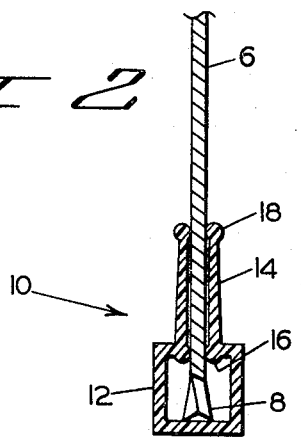

In the drawings:

FIG. 1 is a view in elevation of the herein described saw guard illustrating its application to a hand saw; and FIG. 2 is a transverse sectional view of the saw guard further illustrating its construction.

As shown in the drawings, the saw guard of my invention is applicable to a hand saw 6 having teeth 8. The hand saw may be of the various categories indicated above e.g. a carpenter's saw, a metal worker's saw, a lumberman's saw, or a meat cutter's saw, all of which should be protected from damage when not in use.

The saw guard is indicated generally at 10. It comprises a continuous length of tough, durable, plastic such as "Geon" and hence may be made very inexpensively.

The saw guard comprises basically two sections, a chamber section adapted to receive the saw teeth and a grip section adapted releasably to grip the saw in the area immediately beyond the teeth.

Chamber section 12 of the saw teeth is of enlarged cross sectional area so that it comfortably will receive teeth 8 of the saw. It preferably is open at both ends as well as along the entire length of one side.

Grip section 14 of the saw guard comprises two elongated webs of plastic material, integral and merging with the open side of the chamber section 12, along opposite margins thereof.

The grip section is dimensioned to receive the saw blade between it component webs. Accordingly, the webs extend inwardly along the opposite faces of the saw blade a sufficient distance to obtain the required gripping area, but do not necessarily cover the entire surface of the saw blade.

The webs are tensioned to press against the opposite side faces of the saw blade. This is accomplished by building a tension into the plastic as it is extruded.

To this end, the central portions of the webs are thinned slightly while the portions of the web merging with chamber section 12 are thickened by the provision of longitudinally extending internal beads 16. Application to the webs of the tensioning members of the forming die as the guard is extruded then results in the opposed webs resiliently bearing against each other, and hence, when in place on the saw blade, against the opposite faces of the latter.

To facilitate application of the guard to the saw, there also are provided external beads 18 running the length of the web members. The arcuate surfaces provided by the external beads facilitate guiding the guard onto the saw.

In use, the guard is applied merely by spreading the webs apart and slipping the guard along the length of the saw with the teeth contained in chamber section 12 and the sawblade gripped between grip sections 14. Where the saw blade is clean, this easily is accomplished.

In place, the guard protects the saw teeth from damage. At the same time it protects the user and surrounding articles from damage caused by inadvertent contact with the teeth. When it is desired to use the saw, a simple manipulation removes the guard from the saw blade. The saw blade then may be set aside and reused indefinitely.

It is to be understood that the form of my invention herein shown and described is to be taken as an illustrative example of the same and that various changes in the shape, size and arrangement of parts may be resorted to without departing from the spirit of my invention or the scope of the subjoined claim.

Having thus described my invention, I claim:

1. For covering the teeth of hand saws and the like during storage, a guard made of a continuous length of extruded plastic and comprising:
(a) a chamber section of enlarged cross sectional area extending the entire length of the guard, open at its ends and along one side, and dimensioned to receive the teeth of the saw, and
(b) a grip section comprising two elongated webs of plastic material merging with the open side of the chamber section along opposite margins thereof,
(c) the grip sections being dimensioned to receive the saw blade,
(d) the webs comprising the grip section being thickened along their inner margins at their points of juncture with the open side of the chamber section to form inwardly extending beads positioned for guiding contact with the saw blade and imparting a predetermined tension to the web.

References Cited

UNITED STATES PATENTS 2,756,790  7/1956  Syndbad _____ 145—35
2,954,118  9/1960  Anderson _____ 145—35

FOREIGN PATENTS 13,751  1895  England.
830,747  3/1960  England.
776,867  11/1934  France.

ROBERT C. RIORDON, *Primary Examiner.*

R. V. PARKER, Jr., *Assistant Examiner.*

UNITED STATES PATENT OFFICE
CERTIFICATE OF CORRECTION

Patent No. 3,417,797                              December 24, 1968

Patrick M. Grogan

It is certified that error appears in the above identified patent and that said Letters Patent are hereby corrected as shown below:

In the heading to the printed specification, lines 3 to 5, "Patrick M. Grogan, Salem, Oreg., assignor of one-fourth to Laurence V. Martin and Lillian N. Martin, jointly, both of Redondo Beach, Calif." should read -- Patrick M. Grogan, 565 Tryon Avenue, N. E., Salem, Oreg. 97303 --.

Signed and sealed this 17th day of March 1970.

(SEAL)
Attest:

Edward M. Fletcher, Jr.                        WILLIAM E. SCHUYLER, JR.
Attesting Officer                                    Commissioner of Patents